US010014086B2

(12) United States Patent
Lu et al.

(10) Patent No.: US 10,014,086 B2
(45) Date of Patent: Jul. 3, 2018

(54) INTEGRATED METHOD AND APPARATUS FOR REMEDIATION OF URANIUM-CONTAMINATED SOILS

(71) Applicant: NORTH CHINA ELECTRIC POWER UNIVERSITY, Beijing (CN)

(72) Inventors: Hongwei Lu, Beijing (CN); Lixia Ren, Beijing (CN); Li He, Beijing (CN)

(73) Assignee: NORTH CHINA ELECTRIC POWER UNIVERSITY, Beijing (CN)

(*) Notice: Subject to any disclaimer, the term of this patent is extended or adjusted under 35 U.S.C. 154(b) by 161 days.

(21) Appl. No.: 14/690,460

(22) Filed: Apr. 19, 2015

(65) Prior Publication Data
US 2015/0310951 A1 Oct. 29, 2015

(30) Foreign Application Priority Data

Apr. 24, 2014 (CN) .......................... 2014 1 0168041

(51) Int. Cl.
*G21F 9/00* (2006.01)
*B01J 19/12* (2006.01)
(Continued)

(52) U.S. Cl.
CPC ............ *G21F 9/001* (2013.01); *B01J 19/127* (2013.01); *B09C 1/02* (2013.01); *B09C 1/08* (2013.01); *G21F 9/28* (2013.01); *G21F 9/30* (2013.01)

(58) Field of Classification Search
CPC .... G21F 9/001; G21F 9/30; G21F 9/28; B01J 19/127; B09C 1/08; B09C 1/02
(Continued)

(56) References Cited

U.S. PATENT DOCUMENTS 4,548,790 A * 10/1985 Horwitz .............. C01F 17/0006
423/10
5,202,033 A * 4/1993 Stanforth .................. B09C 1/08
588/256

(Continued)

FOREIGN PATENT DOCUMENTS

CN 103252344 A 8/2013
JP 2007271409 A1 * 10/2007

OTHER PUBLICATIONS

First Office Action in CN Patent Application No. 201410168041.1, dated Mar. 18, 2015.
(Continued)

*Primary Examiner* — Ibrahime A Abraham
*Assistant Examiner* — Colleen M Raphael
(74) *Attorney, Agent, or Firm* — Syncoda LLC; Feng Ma; Junjie Feng

(57) ABSTRACT

Apparatus and method are provided for the treatment of uranium-contaminated soil by using comprehensive joint technology. The apparatus include the pumping system, the electrokinetic remediation system, elution system, remediation-separation system and recharge system. The remediation technologies (i.e. chemical, photolysis and electrokinetic) are used to remedy the uranium-contaminated soil. First, extract uranium from the contaminated areas and make the ionized uranium extract from the soil phase to the solution phase. Then, use the electrokinetic remediation technology to drive uranium enrichment electromigrate to near the anode. Finally, return the repaired-soil and groundwater back to anode area and recharge well, respectively. This comprehensive joint apparatus can reduce the uranium volume in the contaminated soil or water, and recycle the obtained uranium, which are cleaning processes and have no secondary pollution.

7 Claims, 3 Drawing Sheets

(51) Int. Cl.
*B09C 1/08* (2006.01)
*B09C 1/02* (2006.01)
*G21F 9/28* (2006.01)
*G21F 9/30* (2006.01)

(58) Field of Classification Search
USPC .............. 204/157.5, 157.52; 205/46, 766
See application file for complete search history.

(56) References Cited

U.S. PATENT DOCUMENTS

| | | | |
|---|---|---|---|
| 5,348,422 A * | 9/1994 | Manchak, III | B09C 1/08 |
| | | | 405/128.35 |
| 5,458,747 A * | 10/1995 | Marks | B01D 61/42 |
| | | | 204/515 |
| 5,464,512 A * | 11/1995 | Yokoyama | B01D 59/34 |
| | | | 204/157.2 |
| 5,814,204 A * | 9/1998 | D'Muhala | C25F 1/00 |
| | | | 205/705 |
| 5,854,061 A * | 12/1998 | Horn | B09C 1/08 |
| | | | 241/1 |
| 5,865,964 A * | 2/1999 | Clarke | B09C 1/085 |
| | | | 204/232 |
| 5,931,557 A * | 8/1999 | Danilychev | B01J 19/124 |
| | | | 422/186.1 |
| 6,145,244 A | 11/2000 | Hodko et al. | |
| 6,193,867 B1 * | 2/2001 | Hitchens | B09C 1/085 |
| | | | 204/515 |
| 6,210,078 B1 * | 4/2001 | Redwine | B09C 1/085 |
| | | | 205/687 |
| 6,221,224 B1 * | 4/2001 | Hitchens | B09C 1/085 |
| | | | 204/515 |
| 2011/0024361 A1 * | 2/2011 | Schwartzel | C02F 1/325 |
| | | | 205/766 |
| 2011/0027018 A1 * | 2/2011 | Baker | B09C 1/08 |
| | | | 405/128.6 |
| 2013/0264222 A1 * | 10/2013 | Bae | G01N 27/4166 |
| | | | 205/782 |

OTHER PUBLICATIONS

Notice of Grant in CN Patent Application No. 201410168041.1, dated May 20, 2015.

* cited by examiner

INTEGRATED METHOD AND APPARATUS FOR REMEDIATION OF URANIUM-CONTAMINATED SOILS

CROSS-REFERENCE TO RELATED APPLICATIONS

The present application claims priority to Chinese Patent Application No. CN 201410168041.1 filed on Apr. 24, 2014, the disclosure of which is hereby incorporated by reference in its entirety.

BACKGROUND

The present disclosure relates to uranium contamination treatment, and specifically it is a comprehensive joint technology-based device and method for the treatment of uranium-contaminated soil.

With China's increasingly rapid exploration and mining of uranium, there emerge numerable uranium tailings and waste ores. Currently, the dedicated storage facility of uranium tailings is the uranium tailings impoundment. According to incomplete statistics, the total amount of uranium tailings worldwide has reached 20 billion tons. Since 1940s, uranium and other radionuclides from a large quantity of in-service or retired uranium tailings have went into the ground water, and flowed and spread with the groundwater, causing serious harm to the ground water and the ecological environment. Uranium is primarily a a-ray source (uranium-235 is 4.679 MeV, uranium-238 is 4.270 MeV), and its half-life period is up to a million years (the half-life of uranium-235 is 704 million years, and the half-life of uranium-238 is 4.46 billion years), with an extremely slow convection velocity. Uranium in the soil will be accumulated in the human body due to the bioaccumulation action, while its chemical behavior and physiological toxicity are similar with lead, which means it will cause chemical toxicity to human and animal kidney. When the volume of uranium in human body is over 3 mg/kg, it will do harm to human body or even cause cancer.

The soil contamination caused by uranium is mainly of three kinds. The first kind of contamination is caused by the test and use of depleted uranium bombs. For example, the UK and the US once conducted the depleted uranium bomb tests, respectively leading to 45 t and 70 t depleted uranium substances left in the environment. The second kind of contamination is caused by the production and test of nuclear weapons. The contaminated soil caused by the nuclear weapon production of US Department of Energy is estimated to be $3.0 \times 10^7$-$8.0 \times 10^7$ $m^3$, and the contaminated water is of $1.8 \times 10^9$-$4.7 \times 10^9$ $m^3$. The third kind of contamination is caused by waste water, waste gas, waste residue, etc. discharged by nuclear power plants. On Mar. 11, 2011, an explosion occurred in Fukushima Daiichi, which used uranium-235 as the fuel for nuclear reactor, and the leaked radioactive material—uranium received much concern all over the world. The fourth kind of contamination is caused by waste residue of uranium tailings. The volume of uranium tailings waste is estimated to reach $9.38 \times 10^8$ $m^3$ due to the uranium mining. China's uranium mines are located in more than 30 counties of 15 provinces and cities nationwide, ⅔ or more of uranium mines are located in mountainous, humid and rainy regions, while nearly ⅓ are located in hills and arid regions. Over the years, the total amount of waste ores mined from uranium mines are about 28 million tons, covering an area of 250 $hm^3$. And uranium tailings charged by waste water treatment plants are about 30 million tons, which is covering an area of 375 $hm^3$ if calculated as its average stacking height of 4 m.

Uranium exists in the soil in an adsorbed state (in soil particles and pore water), the compound state, the sediment state and the exchangeable state, while these sates will greatly affect the uranium migration. Due to the huge nuclear pollution hazards, the depollution of nuclear contamination in a large scale is a worldwide problem. All walks of life are looking for ways to clear nuclear contamination, and they have achieved some results. The depollution methods adopted by most countries include: physical methods, chemical methods, electrochemical methods, physical-chemical methods, microbial clearance and soil nuclear contamination removal method, but these methods are usually of a high cost and easy to cause a secondary pollution to the environment, failing to solve the problem of radionuclides removal fundamentally. Although the forest restoration method can remedy the contaminated soil in a large scale, and can be used for the development of industrial raw material forest and firewood forest, but its required radionuclide concentration can only be at a not high level, greatly restricting its application. Foreign scholars mainly adopt chemical method for the treatment of uranium-contaminated soil, for example, Caroline et. al (1998) uses sodium bicarbonate for the extraction of uranium in soil solution, and then adopts the ion exchange technology to remove the uranium in the soil solution. Kantar et al. (2006) points out that the citric acid elution technique can be used to improve the clearance efficiency of uranium in soil under the weak acid condition. And Crean et. al (2013) uses multi-level chemical extraction techniques for the remediation of depleted uranium particles in contaminated soil. Currently, in China, researches on the uranium-contaminated soil are mainly focused on bioremediation, for example, the patent CN200810030860.4 discloses a method of using American phyotalacca acinosa seedling for the treatment of the soil contaminated by uranium tailings; patent CN201210056468.3 discloses a method of using water spinach for the treatment of soil contaminated by high-concentration uranium, and the patent CN201210155561.X discloses a method of using fertilizer to promote the treatment of soil contaminated by uranium or cadmium with broad beans.

SUMMARY

Considering the current technology deficiency, in this paper a comprehensive joint technology-based device for the treatment of uranium-contaminated soil is provided.

In order to achieve the goal above, this invention is adopting the following technical program:

The comprehensive joint technology-based device for the treatment of uranium-contaminated soil is of the following structure: Set the cathode zone 5 and anode zone 6 at both sides of uranium-contaminated soil, and set the cathode and anode respectively in those two zones, which are respectively connected to the power transformer 9 with wires; set several sprinklers 10 between cathode zone 5 and anode zone 6 in the form of an array; set pumping well 1 in the vicinity of the cathode zone 5, with pumping pipeline 3 in it, and pumping pipeline 3, pump 11 and pumping controller 12 should be connected to the water collecting sump 13 sequentially; set the soil storage tank 14 near the water collecting sump 13, and connect one end of the remediation-separation system 15 to the soil storage tank 14 and water collecting sump 13, while connect the other end to the soil recovery tank 16, ground water recovery tank 17 and uranium recovery tank 18; set recharge well 2 in the vicinity of the anode zone 6, with the recharge pipeline 4 in it, and the recharge pipeline 4, recharge pump 19 should be connected to the groundwater storage tank 17 sequentially.

Said comprehensive joint technology-based device for the treatment of uranium-contaminated soil further comprises the catholyte processing system 7 and anolyte processing system 8. The catholyte processing system 7 comprises a catholyte storage compartment, a catholyte pH controller and a peristaltic pump; the catholyte pH controller is connected to the catholyte storage compartment, while the catholyte storage compartment is connected to the cathode zone 5 through the corresponding pipeline and the peristaltic pump. The anolyte processing system 8 comprises an anolyte storage compartment, an anolyte pH controller and a peristaltic pump; the anolyte pH controller is connected to the anolyte storage compartment, while the anolyte storage compartment is connected to the anode zone 6 through the corresponding pipeline and the peristaltic pump.

The remediation-separation system 15 mentioned above is composed by the photoelectric remediation device 22, the screen 23, the solid phase extraction device 24, the aqueous phase processing device 25, and the solid phase processing device 26. One end of the photoelectric remediation device 22 is connected to the water collecting sump 13 and the soil storage tank 14, and the other end is connected to the screen 23; the screen 23 is respectively connected to the aqueous phase processing device 25 and the solid phase extraction device 24; the aqueous phase processing device 25 is connected to the ground water recovery tank 17; the solid phase extraction device 24 is connected to the solid phase processing device 26 and the uranium recovery tank 18; the solid phase processing device 26 is connected to the soil recovery tank 16.

The pumping pipeline 3 and the recharge pipeline 4 mentioned above are both non-sand concrete tube wells. Their inner diameter is of 250-500 mm and depth of 35-50 m, and their periphery is filled with backfill and gravels, with the filling layer of 60-100 mm in thickness.

The cathode and anode mentioned above are both plate electrodes.

A uranium-contaminated soil treatment method with the use of the comprehensive joint technology-based device for the treatment of uranium-contaminated soil mentioned above is of the following steps:

Step 1: Install the comprehensive joint technology-based device for the treatment of uranium-contaminated soil at the site contaminated by uranium, with the cathode, anode, pumping pipeline 3 and recharge pipeline 4 inserted into the soil, and the sprinklers 10 above the contaminated soil;

Step 2: Spray the eluting solution via multiple sprinklers 10 to the soil until the concentration of eluting solution in the soil is 10-30 ml/g;

Step 3: Add the catholyte and anolyte respectively in the cathode zone 5 and the anode zone 6, and maintain the voltage between the cathode and anode of 150-600V via the power transformer 9; keep the electrokinetic remediation for 2-8 days, and then uranium substances will migrate to the vicinity of anode, leading to the gathering of uranium pollutants;

Step 4: During the electrokinetic remediation, start up the pump 11 to transport the contaminated ground water in the phreatic layer to the water collecting sump 13 through the pumping pipeline 3, with the pumping volume of 5-10 m$^3$/h and lasting for 1.5-6 days;

Step 5: When the electrokinetic remediation is finished, excavating the soil in the area within the diameter of 1-2.5 m and the depth of 10-20 m centered on the anode zone 6, and then transport it to the soil storage tank 14;

Step 6: Transport the contaminated soil in the soil storage tank 14 and the contaminated water in the water collecting sump 13 to the remediation-separation system 15, and mix the soil and ground water to form a suspension; adjust the pH of the suspension to 2.8-3.5, and irradiate it with the fluorescent light for 24-36 h for the photolysis remediation, then the uranium compound in the suspension will become the uranyl hydroxide and deposit; after the remediation, deposit and separate the soil, water and uranyl hydroxide, and respectively transport them to the soil recovery tank 16, the ground water recovery tank 17 and the uranium recovery tank 18;

Step 7: Transport the soil remedied through the photolysis in the soil recovery tank 16 to the vicinity of the anode zone 6, and start up the recharge pump 19 to transport the remedied ground water in the ground water recovery tank 17 to the recharge well 2 via the recharge pipeline 4;

Step 8: Test the soil remediation effect, and repeat Step 1 to Step 7 if needed until the uranium in the soil meets the requirement of the safety standards or is totally removed.

Specifically:

Before Step 1, conduct the ground investigation of the soil contaminated by the radioactive uranium that remains to be treated, so as to get information of the contaminated soil area, hydrogeological conditions, types of pollutants, and data of the physical and chemical nature, thus determining the contamination status.

After Step 1, the pumping pipeline 3 and the recharge pipeline 4 should be 0.5-2 m in depth across the phreatic layer.

After Step 1, the cathode and anode should be inserted 10-20 m in depth into the contaminated soil surface, tangent with and the phreatic layer.

The used eluting solution in Step 2 is the 0.2-0.6M citric acid solution or sodium bicarbonate solution.

The spray duration in Step 2 is 2-4 h.

The weight/volume of soil and ground water in the suspension used in Step 6 is 1 g: (10-20) ml.

The separation of soil, water and uranyl hydroxide in Step 6 can be achieved as follows: when the photolysis remediation is finished, solid substances and the solution in the suspension will be separated through the screen 23, and the screen whose bore diameter is 0.22 micron is preferred; transport the obtained ground water through the separation to the aqueous phase processing device 25 to adjust a neural pH, and then transport it to the ground water recovery tank 17; transport the obtained soil to the solid phase extraction device 24 to recover the uranyl hydroxide precipitate in the soil with the use of the TBP-sulfonated kerosene extraction technique, and then transport the recovered uranium substances to the uranium recovery tank 18; transport the rest soil to the solid phase processing device 26 to adjust a neural pH, and then transport it to the soil recovery tank 16.

In Step 8, adopt the inductively coupled plasma atomic emission spectrometry (ICP-AES) to measure the residual volume of uranium in soil and in the uranium recovered solution, so as to get the soil remediation effect.

Beneficial effects of the invention include:

(1) This comprehensive joint technology can not only reduce the uranium volume in the contaminated soil or water, but also recycle the obtained uranium; (2) the electrokinetic technique can gather the uranium to the vicinity of the anode, which is convenient for the centralized processing; (3) add the extracting agent, citric acid or sodium bicarbonate solution to the soil can effectively extract the uranium from the soil phase to the aqueous phase; (4) the photolysis can deposit the uranium, which is convenient for further recycling; (5) the treatment process is clean and will not cause secondary pollution with a shorter processing cycle and guaranteed security.

Figure 1:
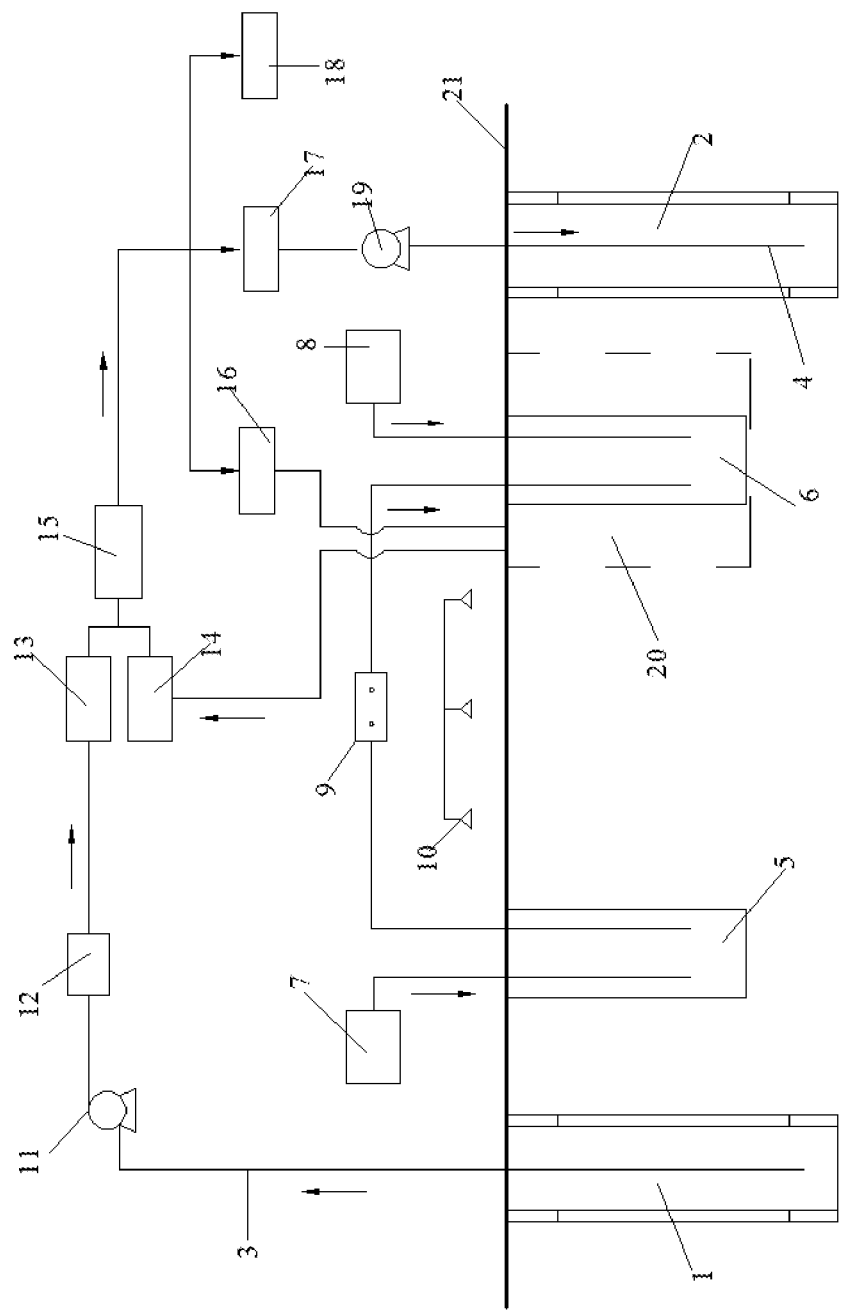
FIG. 1 is the diagram of the comprehensive joint technology-based device and method for the treatment of uranium-contaminated soil.

Numerals in the drawing represent: 1—pumping well; 2—recharge well; 3—pumping pipeline; 4—recharge pipeline; 5—cathode zone; 6—anode zone; 7—catholyte processing system; 8—anolyte processing system; 9—the power transformer; 10—sprinklers; 11—pump; 12—pumping controller; 13—water collecting sump; 14—soil storage tank; 15—remediation-separation system; 16—soil recovery tank; 17—ground water recovery tank; 18—uranium recovery tank; 19—recharge pump; 20—soil excavating zone; 21—soil surface; 22—photoelectric remediation device; 23—screen; 24—solid phase extraction device; 25—aqueous phase processing device; 26—solid phase processing device.

DETAILED DESCRIPTION

Figure 2:
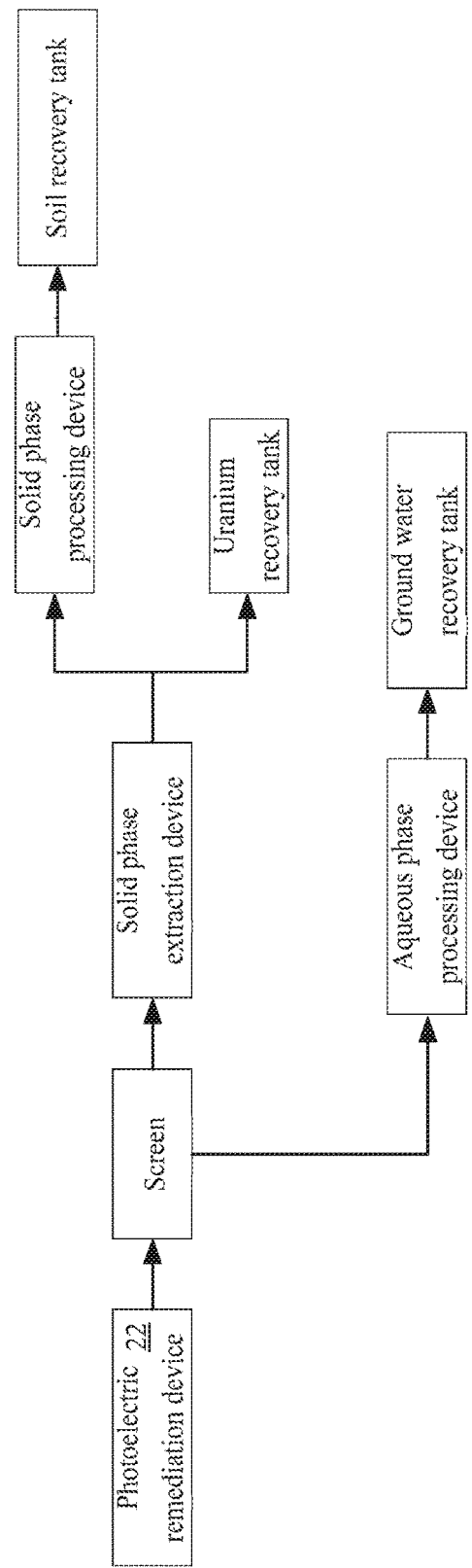
FIG. 2 is the diagram of the remediation-separation system 15.

Here, a further introduction of this invention will be made combined with the attached figures and specific examples:

FIG. 1 is the diagram of the invented comprehensive joint technology-based device for the treatment of uranium-contaminated soil, which is composed by the pumping system, the electrokinetic remediation system, elution system, remediation-separation system and recharge system. The specific structure is as follows: set the cathode zone 5 and anode zone 6 at each side of the uranium-contaminated soil, and respectively set the cathode and anode inside the cathode zone 5 and anode zone 6, which are respectively connected to the power transformer 9. Control the volume, pH and other parameters of catholyte and anolyte in the cathode zone 5 and anode zone 6 through the catholyte processing system 7 and anolyte processing system 8. The catholyte processing system 7 is composed by a catholyte storage compartment, a catholyte pH controller and a peristaltic pump; the catholyte pH controller is connected to the catholyte storage compartment, while the catholyte storage compartment is connected to the cathode zone 5 through the peristaltic pump. The anolyte processing system 8 is composed by an anolyte storage compartment, an anolyte pH controller and a peristaltic pump; the anolyte pH controller is connected to the anolyte storage compartment, while the anolyte storage compartment is connected to the anode zone 6 through the peristaltic pump. Multiple sprinklers 10 will be set between the cathode zone 5 and anode zone 6 in the form of an array, and when the device is installed at the site of the contaminated soil, these sprinklers can spray on the contaminated soil between the cathode zone 5 and anode zone 6. Set the pumping well 1 in the vicinity of the cathode zone 5, and set the pumping pipeline 3 in it. The pumping pipeline 3 is connected to the pump 11, and the pump 11 and the pumping controller 12 are sequentially connected to the water collecting sump 13, so as to transport the contaminated ground water in the in shallow water layer to the water collecting sump 13; set the soil storage tank 14 in the vicinity of the water collecting sump 13, which is used for the storage of soil after the electrokinetic remediation. One side of the remediation-separation system 15 is connected to the water collecting sump 13 and the soil storage tank 14, while the other side is respectively connected to the soil recovery tank 16, the ground water recovery tank 17 and the uranium recovery tank 18. As is shown in FIG. 2, adopt the remediation-separation system 15 for the photolysis remediation of contaminated ground water and the obtained soil after the electrokinetic remediation, and specifically, the remediation-separation system 15 is composed by the photoelectric remediation device 22, the screen 23, the solid phase extraction device 24, the aqueous phase processing device 25 and the solid phase processing device 26. And one side of the photoelectric remediation device 22 is connected to the water collecting sump 13 and the soil storage tank 14, and the other side is connected to the screen 23, while the screen 23 is respectively connected to the aqueous phase processing device 25 and the solid phase extraction device 24; the aqueous phase processing device 25 is connected to the ground water recovery tank 17; the solid phase extraction device 24 is connected to the solid phase processing device 26 and the uranium recovery tank 18; and the solid phase processing device 26 is connected to the soil recovery tank 16. Set the pumping recharge well 2 in the vicinity of the anode zone 6, and set the recharge pipeline 4 inside it. The recharge pipeline 4 is connected to the recharge pump 19, and the recharge pump 19 is connected to the ground water recovery tank 17.

The pumping pipeline 3 and the recharge pipeline 4 adopted by this research are both non-sand concrete tube wells. Their inner diameter is of 250-500 mm and depth of 35-50 m, and their periphery is filled with backfill and gravels, with the filling layer of 60-100 mm in thickness. And the cathode and anode mentioned above are both normal plate electrodes.

Embodiment 1

Remedy the uranium-contaminated soil with the use of said device, and the specific steps are as follows:

Step 1: Conduct the ground investigation of the soil contaminated by the radioactive uranium that remains to be treated, so as to get information of the contaminated soil area, hydrogeological conditions, types of pollutants, and data of the physical and chemical nature, thus determining the contamination status.

Step 2: Install the comprehensive joint technology-based device for the treatment of uranium-contaminated soil at the site contaminated by uranium, with the cathode, anode, pumping pipeline 3 and recharge pipeline 4 inserted under the surface soil 21, and the sprinklers 10 uranium above the contaminated soil; ensure that the pumping pipeline 3 and the recharge pipeline 4 is 0.95 m in depth across the phreatic layer, and the cathode and anode is inserted 12 m in depth into the contaminated soil surface, tangent with and the phreatic layer.

Step 3: Spray the citric acid solution via multiple sprinklers 10 to the contaminated soil, and then measure the volume of eluting solution in different soils (10, 20, 30 ml/g) and the uranium removal efficiency of different eluting duration (2, 3, 4 h).

Step 4: Use the catholyte pH controller and the anolyte pH controller to control the pH of catholyte and anolyte, and transport the catholyte and anolyte respectively to the cathode zone 5 and the anode zone 6 with the corresponding pumps, and among them the catholyte and anolyte are preferably graphite electrode solution, purchased through the business approach. Maintain the voltage between the cathode and anode of 150V via the power transformer 9, and keep the electrokinetic remediation for two days so as to make uranium substances migrate to the vicinity of anode, leading to the gathering of uranium pollutants;

Step 5: During the electrokinetic remediation, start up the pump 11 to transport the contaminated ground water in the phreatic layer to the water collecting sump 13 through the pumping pipeline 3, with the pumping volume of 5 m$^3$/h and lasting for 1.5 days;

Step 6: When the electrokinetic remediation is finished, excavating the soil in the area within the diameter of 1-2.5 m and the depth of 10 m centered on the anode zone 6, just as the soil excavating zone 20 shown in FIG. 1, and then transport it to the soil storage tank 14;

Step 7: Transport the contaminated soil in the soil storage tank 14 and the contaminated water in the water collecting sump 13 to the remediation-separation system 15, and mix the soil and ground water to form a suspension, while weight/volume of soil and ground water is 10 g:120 ml. Adjust the pH of the suspension to 3.5, and irradiate it with the fluorescent light for 24 h for the photolysis remediation, then the uranium compound in the suspension will become the uranyl hydroxide and deposit. After the remediation, deposit and separate the suspension with the 0.22 micron screen 23. Transport the obtained ground water to the aqueous phase processing device 25 to adjust a neural pH, and then transport it to the ground water recovery tank 17. Transport the obtained soil to the solid phase extraction device 24 to recover the uranyl hydroxide precipitate in the soil with the use of the TBP-sulfonated kerosene extraction technique, and then transport the recovered uranium substances to the uranium recovery tank 18. Finally, transport the rest soil to the solid phase processing device 26 to adjust a neural pH, and then transport it to the soil recovery tank 16.

Step 8: Transport the soil remedied through the photolysis in the soil recovery tank 16 to the vicinity of the anode zone 6, and start up the recharge pump 19 to transport the remedied ground water in the ground water recovery tank 17 to the recharge well 2 via the recharge pipeline 4;

Step 9: Adopt the inductively coupled plasma atomic emission spectrometry (ICP-AES) to measure the residual volume of uranium in soil and in the uranium recovered solution, so as to get the soil remediation effect. Repeat Step 2 to Step 8 if needed until the uranium in the soil meets the requirement of the safety standards or is totally removed.

The test result is shown in the following table:

TABLE 1

The uranium removal efficiency of different eluting duration and volumes

| | Eluting solution volume in soil (ml/g) | | | | | | | | |
|---|---|---|---|---|---|---|---|---|---|
| | 10 | | | 20 | | | 30 | | |
| | Eluting duration (h) | | | | | | | | |
| | 2 | 3 | 4 | 2 | 3 | 4 | 2 | 3 | 4 |
| Uranium removal efficiency (%) | 51.3 | 62 | 60.9 | 63.4 | 75.1 | 83.7 | 69.7 | 80.2 | 79.8 |

Embodiment 2

Figure 3:
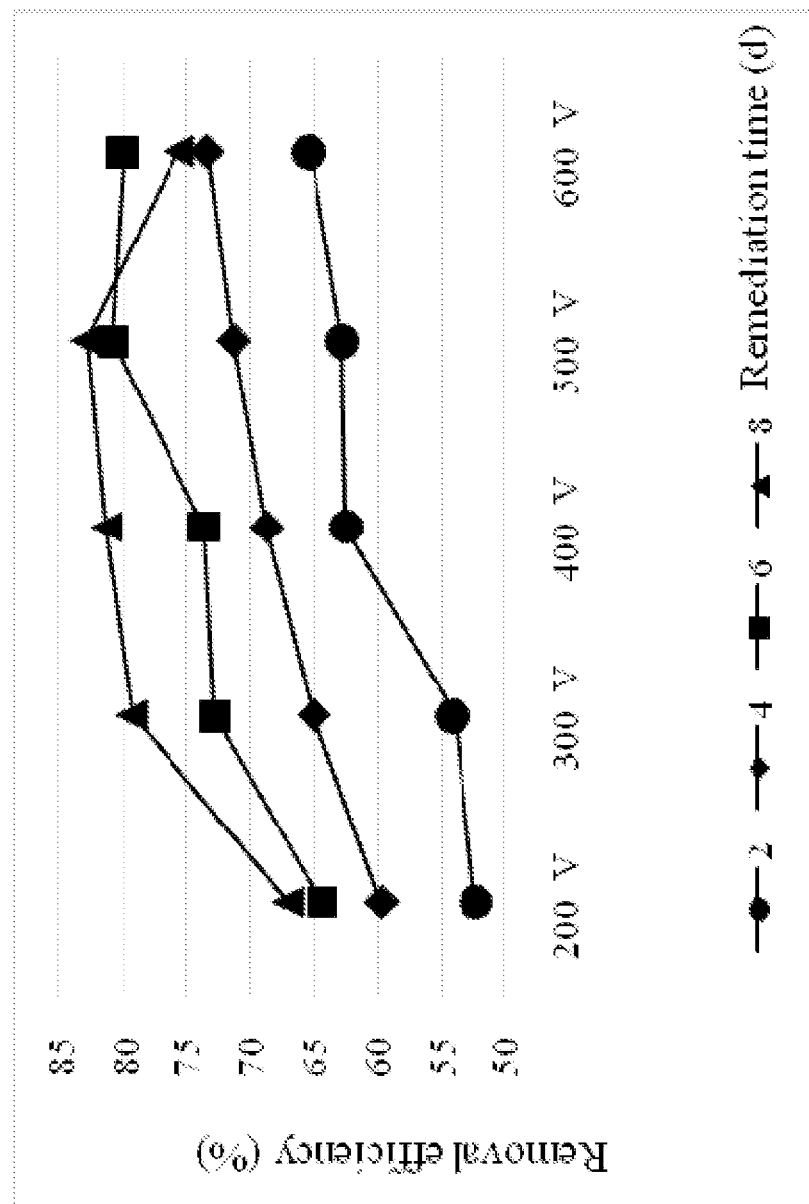
FIG. 3 is the treatment effect of the uranium-contaminated soil with different voltages and electrokinetic remediation duration.

Specific approaches are the same with the implementation example 1, but change the voltage and remediation duration of the electrokinetic remediation, and then analyze the uranium removal efficiency changes of ICP-AES under the different voltages (200V, 300V, 400V, 500V, 600V) and electrokinetic remediation duration (2, 4, 6, 8 day). The result is shown in FIG. 3. It can be seen that increasing the voltage or prolonging the electrokinetic remediation duration time will help to improve the removal efficiency of uranium in soil, and when the voltage is 500V with the electrokinetic remediation time of 8 d, the repair efficiency will be up to 82.9%.

The invention claimed is:

1. A comprehensive joint technology-based apparatus for treatment of a uranium-contaminated soil, the apparatus comprising:
   an electrokinetic remediation system including a cathode zone and an anode zone set at both sides of the uranium-contaminated soil, and a cathode and an anode disposed respectively in the cathode and anode zones, the cathode and anode being respectively connected to a power transformer with wires;
   an elution system including a plurality of sprinklers disposed between the cathode zone and the anode zone forming an array;
   a pumping system including a pumping well disposed in a vicinity of the cathode zone, with a pumping pipeline therein, wherein the pumping pipeline, a pump and a pumping controller are connected to a water collecting sump sequentially;
   a soil storage tank disposed adjacent to the water collecting sump;
   a remediation-separation system having one end connected to the soil storage tank and water collecting sump, with another end connected a soil recovery tank, a ground water recovery tank and a uranium recovery tank;
   a recharge system including a recharge well set in a vicinity of the anode zone, with a recharge pipeline therein; and
   an inductively coupled plasma atomic emission spectrometer (ICP-AES) configured to measure residual uranium;
   wherein the recharge pipeline, and a recharge pump are connected to the ground water storage tank sequentially,
   wherein the sprinklers are used to spray an eluting solution to the contaminated soil,
   wherein the eluting solution is a 0.2-0.6 M citric acid solution or a sodium bicarbonate solution, and
   wherein the remediation-separation system is configured to form a uranyl hydroxide deposit from a suspension containing a uranium compound by illuminating the suspension with fluorescent light;
   wherein the pumping pipeline and the recharge pipeline are approximately 0.95 m in depth across a phreatic layer; and the cathode and anode are inserted approximately 12 m in depth into the contaminated soil, tangent with the phreatic layer, such that a uranium removal efficiency of at least 80.2% is achieved with an eluting duration of 3 h and an eluting solution volume in soil of 30 ml/g.

2. The apparatus of claim 1, further comprising:
   a catholyte processing system; and
   an anolyte processing system, the catholyte processing system including a catholyte storage compartment, a catholyte pH controller and a peristaltic pump;

wherein the catholyte pH controller is connected to the catholyte storage compartment, while the catholyte storage compartment is connected to the cathode zone through a corresponding pipeline and a peristaltic pump;

the anolyte processing system including an anolyte storage compartment, an anolyte pH controller and a peristaltic pump;

the anolyte pH controller is connected to the anolyte storage compartment, while the anolyte storage compartment is connected to the anode zone through the corresponding pipeline and the peristaltic pump.

3. The apparatus of claim 1, wherein the remediation-separation system comprises:
a photoelectric remediation device,
a screen,
a solid phase extraction device,
an aqueous phase processing device, and
a solid phase processing device;
wherein one end of the photoelectric remediation device is connected to the water collecting sump and the soil storage tank, and another end is connected to the screen;
wherein the screen is respectively connected to the aqueous phase processing device and the solid phase extraction device;
the aqueous phase processing device is connected to the ground water recovery tank; the solid phase extraction device is connected to the solid phase processing device and the uranium recovery tank;
the solid phase processing device is connected to the soil recovery tank.

4. The apparatus of claim 1, wherein the pumping pipeline and the recharge pipeline are both non-sand concrete tube wells having an inner diameter of about 250-500 mm and a depth of about 35-50 m, and a periphery filled with backfill and gravels, with a filling layer of about 60-100 mm in thickness.

5. A method for use with the apparatus of claim 1, the method comprising:
Step 1: installing the comprehensive joint technology-based apparatus for treatment of uranium-contaminated soil at a site contaminated by uranium;
Step 2: spraying an eluting solution via multiple sprinklers to the soil until the concentration of eluting solution in the soil is 10-30 ml/g;
Step 3: adding the catholyte and anolyte respectively in the cathode zone and the anode zone, and maintaining a voltage between the cathode and anode of 150-600V via the power transformer; keeping the electrokinetic remediation for 2-8 days, and then uranium substances will migrate to the vicinity of anode, leading to gathering of uranium pollutants;
Step 4: during the electrokinetic remediation, starting up the pump to transport contaminated ground water in a phreatic layer to the water collecting sump through the pumping pipeline, with the pumping volume of 5-10 $m^3/h$ and lasting for 1.5-6 days;
Step 5: if the electrokinetic remediation is finished, excavating the soil in the area within the diameter of 1-2.5 m and the depth of 10-20 m centered on the anode zone, and then transport it to the soil storage tank;
Step 6: transporting the contaminated soil in the soil storage tank and the contaminated water in the water collecting sump to the remediation-separation system, and mix the soil and ground water to form a suspension; adjust the pH of the suspension to 2.8-3.5, and irradiate the suspension with fluorescent light for 24-36 h for photolysis remediation, to thereby have a uranium compound in the suspension become a uranyl hydroxide deposit; after the photolysis remediation, separate the soil, water, and the uranyl hydroxide deposit, and respectively transport them to the soil recovery tank, the ground water recovery tank and the uranium recovery tank;
Step 7: transporting the soil remedied through the photolysis in the soil recovery tank (16) to the vicinity of the anode zone, and start up the recharge pump to transport the remedied ground water in the ground water recovery tank to the recharge well via the recharge pipeline;
Step 8: testing the soil remediation effect with the ICP-AES, and repeating Step 1 to Step 7 if needed until the uranium in the soil meets the requirement of the safety standards or is totally removed;
wherein after Step 1, the pumping pipeline and the recharge pipeline are approximately 0.95 m in depth across a phreatic layer; and the cathode and anode are inserted approximately 12 m in depth into the contaminated soil, tangent with the phreatic layer, such that a uranium removal efficiency of at least 80.2% is achieved with an eluting duration of 3 h and an eluting solution volume in soil of 30 ml/g.

6. The method of claim 5, wherein a weight/volume ration of soil and ground water in the suspension in Step 6 is 1 g:(10-20) ml.

7. The method of claim 5, wherein the separation of soil, water and uranyl hydroxide in Step 6 is achieved as follows:
when the photolysis remediation is finished, solid substances and the solution in the suspension are separated through the screen having openings with a diameter of about 0.22 micron;
transporting the obtained ground water through the separation to the aqueous phase processing device to adjust a neutral pH, and then transporting it to the ground water recovery tank;
transporting the obtained soil to the solid phase extraction device to recover the uranyl hydroxide precipitate in the soil with the use of the TBP-sulfonated kerosene extraction technique, and then transporting the recovered uranium substances to the uranium recovery tank; and
transporting remaining soil to the solid phase processing device to adjust a neutral pH, and then transport it to the soil recovery tank.

* * * * *